(12) United States Patent
Bespalov et al.

(10) Patent No.: US 7,778,778 B2
(45) Date of Patent: Aug. 17, 2010

(54) CORRECTION OF MULTI-COMPONENT MEASUREMENTS FOR TOOL ECCENTRICITY IN DEVIATED WELLS

(75) Inventors: Alexandre N. Bespalov, Spring, TX (US); Gulamabbas Merchant, Houston, TX (US); Cynthia Dong Xue, Houston, TX (US); Luis M. Pelegri, Humble, TX (US); Michael B. Rabinovich, Houston, TX (US); Stephen V. Painchaud, Tomball, TX (US); Bill H. Corley, Conroe, TX (US); Stanislav W. Forgang, Houston, TX (US); Randy Gold, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 6 days.

(21) Appl. No.: 11/830,480

(22) Filed: Jul. 30, 2007

(65) Prior Publication Data
US 2008/0033654 A1    Feb. 7, 2008

Related U.S. Application Data

(60) Provisional application No. 60/834,905, filed on Aug. 1, 2006.

(51) Int. Cl.
*G01V 9/00* (2006.01)
(52) U.S. Cl. ............................ 702/7; 324/324; 324/338
(58) Field of Classification Search ................ 702/7, 702/10–13; 324/303, 324, 339, 343, 338, 324/345–346; 73/152.02
See application file for complete search history.

(56) References Cited

U.S. PATENT DOCUMENTS

| | | | |
|---|---|---|---|
| 4,302,722 A | 11/1981 | Gianzero | |
| 4,837,517 A | 6/1989 | Barber | |
| 5,157,605 A | 10/1992 | Chandler et al. | |
| 5,600,246 A | 2/1997 | Forgang et al. | |
| 6,470,274 B1 | 10/2002 | Mollison et al. | |
| 6,541,979 B2 | 4/2003 | Omeragic | |
| 6,636,045 B2 | 10/2003 | Tabarovsky et al. | |
| 6,643,589 B2 | 11/2003 | Zhang et al. | |
| 6,686,736 B2 | 2/2004 | Schoen et al. | |
| 6,801,039 B2 | 10/2004 | Fabris et al. | |
| 6,819,111 B2 * | 11/2004 | Fanini et al. | 324/339 |
| 6,958,610 B2 * | 10/2005 | Gianzero | 324/342 |
| 6,998,844 B2 * | 2/2006 | Omeragic et al. | 324/343 |

(Continued)

OTHER PUBLICATIONS

J. H. Moran et al.; *Basic Theory of Induction Logging and Application of Study of Two-Coil Sondes*, Geoophysics, vol. XXVII, No. 6, Part 1, Dec. 1962, pp. 829-858.

(Continued)

*Primary Examiner*—Eliseo Ramos Feliciano
*Assistant Examiner*—Mary C Baran
(74) *Attorney, Agent, or Firm*—Mossman Kumar & Tyler PC

(57) ABSTRACT

Measurements made by a multi-component induction logging tool are corrected for tool eccentricity in a deviated borehole. The eccentricity angle is determined from single frequency skin-effect corrected data and is then used to correct multifrequency data. Multifrequency focusing is then applied to the corrected multifrequency data. An inversion is then used to recover formation resistivity and relative dip and azimuth of the borehole.

18 Claims, 16 Drawing Sheets

U.S. PATENT DOCUMENTS

| | | |
|---|---|---|
| 7,138,897 B2 | 11/2006 | Minerbo et al. |
| 2004/0001388 A1* | 1/2004 | Kriegshauser et al. ........ 367/21 |
| 2004/0196047 A1 | 10/2004 | Fanini et al. |
| 2005/0256645 A1 | 11/2005 | Rabinovich et al. |
| 2007/0234787 A1 | 10/2007 | Rabinovich et al. |

OTHER PUBLICATIONS

J. H. Moran et al.; Basic Theory of Induction Logging and Application of Study of Two-Coil Sondes, Geophysics, vol. XXVII, No. 6, Part 1, Dec. 1962, pp. 829-858.

* cited by examiner

CORRECTION OF MULTI-COMPONENT MEASUREMENTS FOR TOOL ECCENTRICITY IN DEVIATED WELLS

CROSS-REFERENCES TO RELATED APPLICATIONS

This application claims priority from U.S. provisional patent application 60/834,905 filed on 1 Aug. 2006. This application is related to an application being filed concurrently with the same title and inventors as U.S. Ser. No. 11/830,402 filed Jul. 30, 2007, now U.S. Pat. No. 7,629,791 issued Dec. 8, 2009.

BACKGROUND OF THE DISCLOSURE

1. Field of the Disclosure

The disclosure is related generally to the use of multi-component resistivity measurements for determination of properties of earth formations.

2. Background of the Art

Electromagnetic induction resistivity well logging instruments are well known in the art. Electromagnetic induction resistivity well logging instruments are used to determine the electrical conductivity, and its converse, resistivity, of earth formations penetrated by a borehole. Formation conductivity has been determined based on results of measuring the magnetic field of eddy currents that the instrument induces in the formation adjoining the borehole. The electrical conductivity is used for, among other reasons, inferring the fluid content of the earth formations. Typically, lower conductivity (higher resistivity) is associated with hydrocarbon-bearing earth formations. The physical principles of electromagnetic induction well logging are well described, for example, in, J. H. Moran and K. S. Kunz, *Basic Theory of Induction Logging and Application to Study of Two-Coil Sondes*, Geophysics, vol. 27, No. 6, part 1, pp. 829-858, Society of Exploration Geophysicists, December 1962. Many improvements and modifications to electromagnetic induction resistivity instruments described in the Moran and Kunz reference, supra, have been devised, some of which are described, for example, in U.S. Pat. No. 4,837,517 to Barber, in U.S. Pat. No. 5,157,605 to Chandler et al., and in U.S. Pat. No. 5,600,246 to Fanini et al.

Conventional induction well logging techniques employ an insulating pipe inside a coil mandrel. One or more transmitter coils are energized by an alternating current. The oscillating magnetic field produced by this arrangement results in the induction of currents in the formations which are nearly proportional to the conductivity of the formations. These currents, in turn, contribute to the voltage induced in one or more receiver coils. By selecting only the voltage component which is in phase with the transmitter current, a signal is obtained that is approximately proportional to the formation conductivity. In conventional induction logging apparatus, the basic transmitter coil and receiver coil have axes which are aligned with the longitudinal axis of the well logging device. This arrangement tends to induce secondary current loops in the formations that are concentric with the vertically oriented transmitting and receiving coils. The resultant conductivity measurements in a vertical well (one with its axis normal to bedding) are indicative of the horizontal conductivity (or resistivity) of the surrounding formations. There are, however, various formations encountered in well logging which have a conductivity that is anisotropic. Anisotropy results from the manner in which formation beds were deposited by nature. For example, "uniaxial anisotropy" is characterized by a difference between the horizontal conductivity, in a plane parallel to the bedding plane, and the vertical conductivity, in a direction perpendicular to the bedding plane. When there is no bedding dip, horizontal resistivity can be considered to be in the plane perpendicular to the borehole, and the vertical resistivity in the direction parallel to the bore hole. Conventional induction logging devices, which tend to be sensitive only to the horizontal conductivity of the formations, do not provide a measure of vertical conductivity or of anisotropy. Techniques have been developed to determine formation anisotropy. See, e.g. U.S. Pat. No. 4,302,722 to Gianzero et al. Transverse anisotropy often occurs such that variations in resistivity occur in the azimuthal direction.

In the transverse induction logging tools the response of transversal coil arrays is determined by an average resistivity, however, the relatively lower conductivity of hydrocarbon-bearing sand layers dominates in this estimation. In general, the volume of shale/sand in the formation can be determined from gamma-ray or nuclear well logging measurements. Then a combination of the conventional induction logging tool with transmitters and receivers oriented along the well axis and the transversal induction logging tool can be used for determining the conductivity of individual shale and sand fractions.

Multi-component signals can be used for interpreting formation resistivities and petrophysical parameters. The principles used for this interpretation have been discussed, for example, in U.S. Pat. No. 6,470,274 to Mollison et al., U.S. Pat. No. 6,643,589 to Zhang et al., U.S. Pat. No. 6,636,045 to Tabarovsky et al., the contents of which are incorporated herein by reference. Specifically, the parameters estimated may include horizontal and vertical resistivities (or conductivities), relative dip angles, strike angles, sand and shale content and water saturation. In addition, U.S. patent application Ser. No. 11/125,530 of Rabinovich et al. teaches the use of multi-component measurements for analysis of fractured earth formations that may also have anisotropic layers.

Not discussed in the prior art is the effect of tool eccentricity on multi-component measurements. U.S. patent application Ser. No. 11/400,548 of Rabinovich et al. having the same assignee as the present application addresses the problem of correcting for a disturbance such as tool eccentricity that affects the azimuthal response of a multicomponent logging tool. The teachings of Rabinovich are primarily directed towards a vertical borehole and demonstrate methods of processing to address the problem. The present disclosure is applicable to deviated boreholes and also presents hardware solutions to the problem of eccentricity.

SUMMARY OF THE DISCLOSURE

Another embodiment of the disclosure is a method of determining a resistivity property of an earth formation. The method includes positioning a logging tool in a borehole with the tool displaced from a center of the borehole in a first direction. Multicomponent measurements are made at a plurality of frequencies indicative of the resistivity property. The multicomponent measurements are used to estimate the resistivity property of the earth formation, and the estimated resistivity property is recorded on a suitable medium. The multicomponent measurements may be obtained using a transmitter antenna on the logging tool with an axis substantially along the first direction. Estimating the resistivity property may be done performing an inversion in which at least one of the multicomponent measurements is excluded. Estimating the resistivity property may include a multifrequency focusing. The method may further include using the estimated resistivity property to determine a horizontal resistivity, a vertical resistivity, a relative dip angle, an azimuthal angle, a sand fraction, a water saturation, and/or a permeability. The method may further include conveying the logging tool into the borehole on a wireline. The method may further include obtaining the multicomponent measurements by using an additional transmitter antenna on a logging tool with an axis substantially orthogonal to the first direction. The transmitter antenna may be extended from a body of the logging tool.

Another embodiment of the disclosure is an apparatus for determining a resistivity property of an earth formation. The apparatus includes a logging tool configured to be positioned in a borehole with the tool displaced from a center of the borehole in a first direction and make multicomponent measurements at a plurality of frequencies indicative of a resistivity property of the earth formation. A processor is configured to estimate from the measurements the resistivity property of the earth formation, and record the estimated resistivity property on a suitable medium. The logging tools may be configured to obtain the multicomponent measurements by using a transmitter antenna on the logging tool with an axis substantially along the first direction. The processor may be further configured to estimate the resistivity property by performing an inversion in which at least one of the measurements is excluded. The processor may be configured estimate resistivity property by applying a multifrequency focusing. The processor may be further configured to use the estimated resistivity property to determine a horizontal resistivity, a vertical resistivity, a relative dip angle, an azimuthal angle, a sand fraction, a water saturation, and/or a permeability. The apparatus may include a wireline configured to convey the logging tool into the borehole. The logging tool may include an additional transmitter antenna within axis substantially orthogonal to the first direction. The transmitter antenna may be extendable from a body of the logging tool.

Another embodiment of the disclosure is a computer-readable medium for use with an apparatus for evaluating an earth formation. The apparatus includes a logging tool configured to be positioned in a borehole with the tool displaced from a center of the borehole in a first direction and make multicomponent measurements indicative of a resistivity property of the earth formation. The medium includes instructions which enable a processor to estimate from the measurements the resistivity property, and record the estimated property on a suitable medium. The medium may include a ROM, (i) an EPROM, (ii) an EEPROM, (iii) a flash memory, and (iv) an optical disk

BRIEF DESCRIPTION OF THE FIGURES

The present disclosure is best understood with reference to the following figures in which like numbers refer to like components and in which.

DETAILED DESCRIPTION OF THE DISCLOSURE

Figure 1:
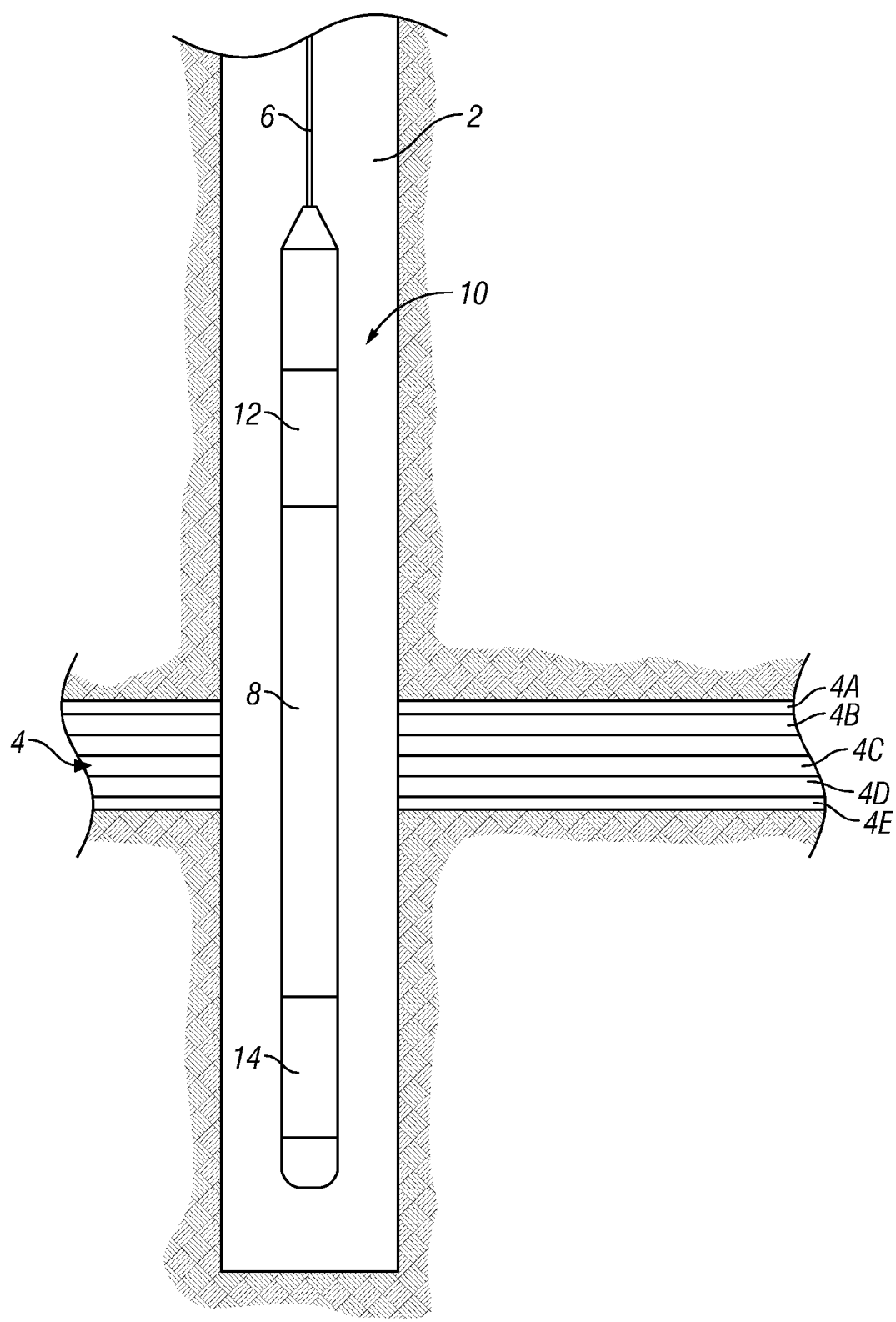
FIG. 1 illustrates an induction instrument disposed in a wellbore penetrating an earth formation.

Referring now to FIG. 1, an electromagnetic induction well logging instrument 10 is shown disposed in a wellbore 2 drilled through earth formations. The earth formations are shown generally at 4. The instrument 10 can be lowered into and withdrawn from the wellbore 2 by use of an armored electrical cable 6 or similar conveyance known in the art. The instrument 10 can be assembled from three subsections: an auxiliary electronics unit 14 disposed at one end of the instrument 10; a coil mandrel unit 8 attached to the auxiliary electronics unit 14; and a receiver/signal processing/telemetry electronics unit 12 attached to the other end of the coil mandrel unit 8, this unit 12 typically being attached to the cable 6.

The coil mandrel unit 8 includes induction transmitter and receiver coils, as will be further explained, for inducing electromagnetic fields in the earth formations 4 and for receiving voltage signals induced by eddy currents flowing in the earth formations 4 as a result of the electromagnetic fields induced therein.

The auxiliary electronics unit 14 can include a signal generator and power amplifiers (not shown) to cause alternating currents of selected frequencies to flow through transmitter coils in the coil mandrel unit 8. A processor which controls the operation of the tool and processing acquired data may be part of the electronics unit. Alternatively, some or all of the processing and control may be done by a surface processor.

The receiver/signal processing/telemetry electronics unit 12 can include receiver circuits (not shown) for detecting voltages induced in receiver coils in the coil mandrel unit 8, and circuits for processing these received voltages (not shown) into signals representative of the conductivities of various layers, shown as 4A through 4F of the earth formations 4. As a matter of convenience the receiver/signal processing/telemetry electronics unit 12 can include signal telemetry to transmit the conductivity-related signals to the earth's surface along the cable 6 for further processing, or alternatively can store the conductivity related signals in an appropriate recording device (not shown) for processing after the instrument 10 is withdrawn from the wellbore 2.

The example in FIG. 1 shows a vertical well. This is not to be construed as a limitation to the disclosure, and the method of the present disclosure may be used for analyzing data acquired in a deviated well.

Figure 2:
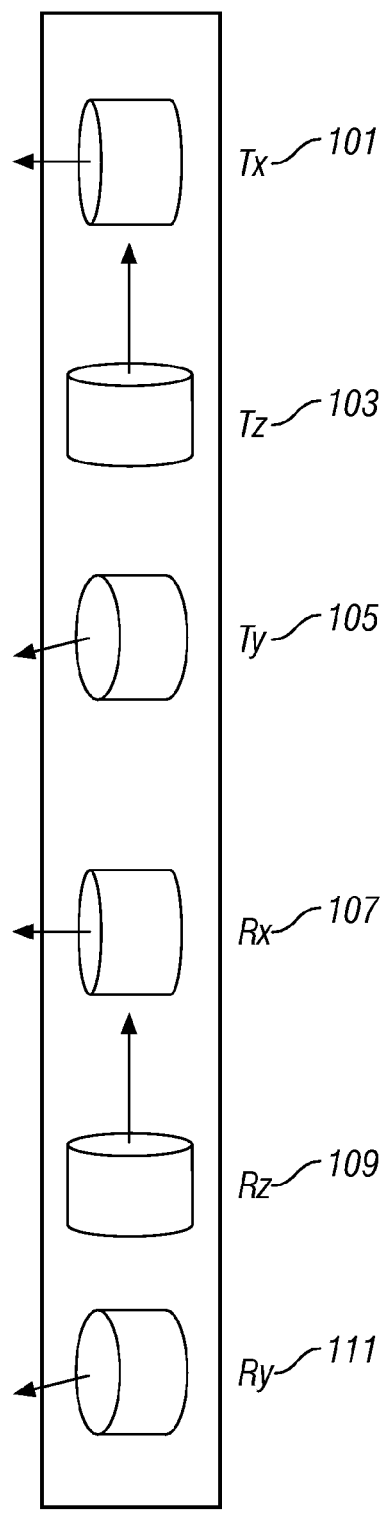
FIG. 2 (prior art) illustrates the arrangement of transmitter and receiver coils in multi-component induction logging tool marketed under the name 3DExplorer™.

Referring to FIG. 2, the configuration of transmitter and receiver coils in the 3DEX™ multi-component induction logging instrument of Baker Hughes is shown. This is for exemplary purposes only and any multi-component tool may be used. Three orthogonal transmitters 101, 103 and 105 that are referred to as the $T_x$, $T_z$, and $T_y$ transmitters are shown (the z-axis is the longitudinal axis of the tool). Corresponding to the transmitters 101, 103 and 105 are associated receivers 107, 109 and 111, referred to as the $R_x$, $R_z$, and $R_y$ receivers, for measuring the corresponding magnetic fields. It should be noted that the method of the present disclosure may also be used with non-orthogonal configurations of transmitters and receivers. Well known coordinate rotation methods may be used with such non-orthogonal measurements to rotate them into the desired orientation. For the purposes of the present disclosure, all such measurements (orthogonal and non-orthogonal) will be referred to as multi-component measurements.

We first discuss the teachings of U.S. patent application Ser. No. 11/400,548 of Rabinovich et al. having the same assignee as the present application. The Rabinovich '548 application addresses the problem of correcting for a disturbance such as tool eccentricity that affects the azimuthal response of a multicomponent logging tool. The method includes making at least one multi-component measurement using a logging tool in a borehole in the earth formation. The multi-component measurements are indicative of a resistivity property of the earth formation and are affected by a disturbance in the azimuthal direction. The method further comprises applying a correction to the multi-component measurements that corrects for the disturbance. The discussion in Rabinovich '548 is primarily directed towards vertical boreholes (borehole axis normal to the bedding plane). It serves as the background for the present disclosure which deals with similar problems in deviated boreholes.

Figure 3:
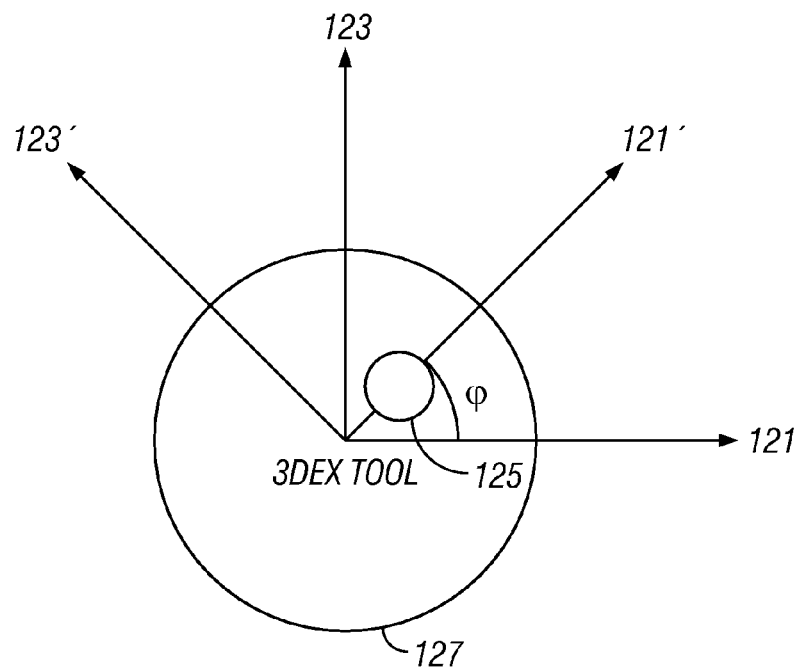
FIG. 3 illustrates an eccentered logging tool inside a borehole.

Turning now to FIG. 3, a top view of an eccentric logging tool 125 is shown within a circular borehole 127. The tool coordinate system is defined by the (x,y) axes 121, 123. The eccentricity direction is defined by the direction 121'. This defines a new coordinate system (x', y') 121', 123'. It can be shown that when a multi-component tool is oriented such that X-coils of the tool are aligned with the eccentricity direction, the $H_{x'x'}$ measurement (coils oriented with magnetic moments parallel to the eccentricity direction) is substantially unaffected by eccentricity. The remaining borehole effect changes very little with eccentricity due to the large spacing between transmitter and receivers. In Table 1 we present results for the numerical eccentricity modeling of XX component in 12.25" hole with 0.05 Ω-m mud for 1.6 m main coil spacing and frequency 20 KHz:

TABLE 1

Apparent resistivities for XX component for different tool eccentricities in X-direction.

| Eccentricity | Apparent Resistivity (ohm · m) | |
|---|---|---|
| (in) | Rt = Rv = 5 Ohm · m | Rt = Rv = 25 Ohm · m |
| 0 | 7.68 | 24.4 |
| 0.5 | 7.69 | 24.5 |
| 1.0 | 7.69 | 24.5 |
| 1.5 | 7.69 | 24.6 |
| 2.0 | 7.70 | 24.7 |

In Table 1, the eccentricity is defined as the distance from the center of the borehole to the center of the logging tool.

The multi-component induction tool of FIG. 2 acquires, among other measurements, $H_{xx}$, $H_{yy}$, and $H_{xy}$ components that are oriented at unknown angle φ with respect to the eccentricity direction and corresponding coordinate system (x',y'). Below we illustrate how from measured $H_{xx}$, $H_{yy}$, and $H_{xy}$ components from an eccentered tool 125 we can determine the orientation of the eccentricity (angle φ). By using a rotation technique, this makes it possible to extract the unaffected corresponding component $H_{x'x'}$. This unaffected component can then be used in subsequent processing for resistivity anisotropy.

For the eccentered tool the measured $H_{xx}$, $H_{yy}$, and $H_{xy}$ components can be expressed through the principal components $H_{x'x'}$ and $H_{y'y'}$ using the known rotation equation:

$$\begin{pmatrix} H_{xx} \\ H_{yy} \\ H_{xy} \end{pmatrix} = \begin{pmatrix} \cos^2\varphi & \sin^2\varphi \\ \sin^2\varphi & \cos^2\varphi \\ -\cos\varphi\sin\varphi & \cos\varphi\sin\varphi \end{pmatrix} \begin{pmatrix} H_{x'x'} \\ H_{y'y'} \end{pmatrix}. \quad (1)$$

When φ≠45°, this relationship allows us immediately determine the angle φ:

$$\varphi = \frac{1}{2}\tan^{-1}\left(\frac{2H_{xy}}{H_{yy} - H_{xx}}\right). \quad (2).$$

Consequently, we can calculate the principal $H_{x'x'}$ component itself:

$$H_{x'x'} = \frac{H_{xx}\cos^2\varphi - H_{yy}\sin^2\varphi}{\cos^2\varphi - \sin^2\varphi}. \quad (3)$$

When φ=45°, the full set of eqns. (1) must be solved.

Those versed in the art and having the benefit of the present disclosure would recognize that given knowledge of the borehole diameter and the mud resistivity (or equivalently, the mud conductivity) the amount of eccentricity of the logging tool can be estimated. From a practical standpoint, this requires the use of a caliper such as an acoustic caliper to give measurements from which the borehole diameter can be estimated, and a mud resistivity measuring device. In one embodiment of the disclosure, an acoustic caliper is provided, and a mud resistivity device such as that disclosed in U.S. Pat. No. 6,801,039 to Fabris et al., (having the same assignee as the present disclosure and the contents of which are incorporated herein by reference) may be used.

Figure 4:
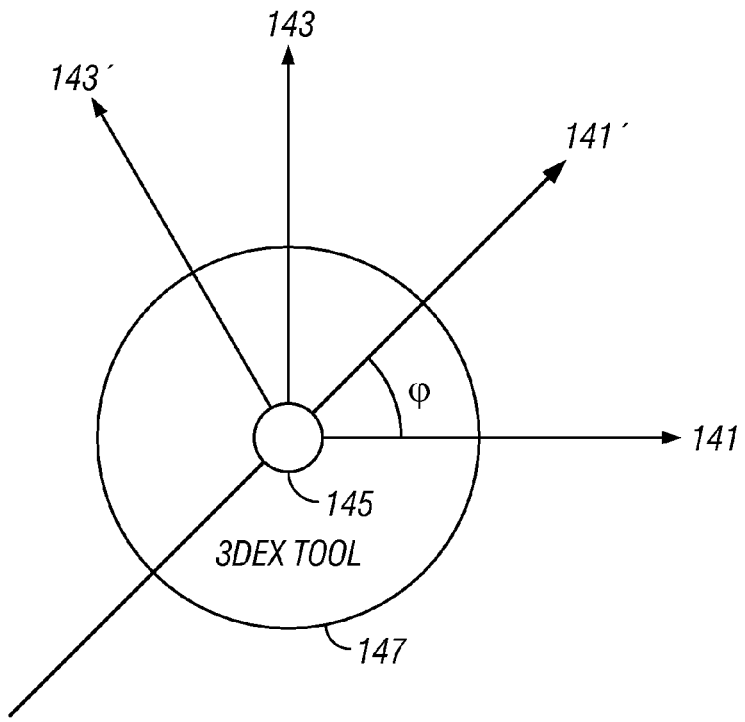
FIG. 4 illustrates a logging tool inside a borehole with a fracture direction indicated thereon.

A similar problem is encountered in the presence of fractures. As discussed in U.S. patent application Ser. No. 11/125,530 of Rabinovich et al., resistive and conductive fractures may significantly affect the measurements of induction tools. The basic geometry is illustrated in FIG. 4 where a 3DEX tool 145 is shown in a circular borehole 147. The tool (x, y) coordinate system is indicated by 141, 143. A fracture plane is indicated by 141' and the normal to the fracture plane is 143'. We consider a rotated coordinate system defined by the directions 141', 143'.

When a multi-component tool is oriented such that X-coils of the tool are aligned with the fracture plane, the $H_{y'y'}$ measurement (coils oriented with magnetic moments perpendicular to the fracture plane) is not affected if the fracture is resistive, i.e., has a higher resistivity than the surrounding medium. This lack of sensitivity is due to the fact that the primary electric field generated by y'-transmitter (at 90° to the fracture plane) and secondary electric field inducing a magnetic field into y'-receiver are parallel to the fracture. It is well known that a thin resistive layer parallel to electric currents does not affect induction measurements.

If, on the other hand, the fracture is conductive, i.e., is has a higher conductivity than the surrounding medium, the $H_{x'x'}$ measurement is not affected by the fracture due to the fact that the primary and secondary electrical currents for this component are perpendicular to the fracture and when they cross it they are not changed by a very narrow conductive interval.

The multi-component induction tool of FIG. 2 acquires, among other component, $H_{xx}$, $H_{yy}$ and $H_{xy}$ components that are oriented at unknown angle $\varphi$ with respect to the fracture and corresponding coordinate system (x',y'). Below we illustrate how from measured $H_{xx}$, $H_{yy}$, and $H_{xy}$ components in the presence of a fracture we can determine the orientation of the fracture (angle $\varphi$) and consequently by using a rotation technique we can extract unaffected corresponding component $H_{x'x'}$, (for a conductive fracture) or $H_{y'y'}$, (for resistive fracture). This unaffected component then will be used in subsequent processing for resistivity anisotropy.

In the presence of fracture the measured $H_{xx}$, $H_{yy}$, and $H_{xy}$ components can be expressed through the principal components $H_{x'x'}$, and $H_{y'y'}$,' using the known rotation equation, the same as eqn. (1):

$$\begin{pmatrix} H_{xx} \\ H_{yy} \\ H_{xy} \end{pmatrix} = \begin{pmatrix} \cos^2\varphi & \sin^2\varphi \\ \sin^2\varphi & \cos^2\varphi \\ -\cos\varphi\sin\varphi & \cos\varphi\sin\varphi \end{pmatrix} \begin{pmatrix} H_{x'x'} \\ H_{y'y'} \end{pmatrix}, \quad (4)$$

When $\varphi \neq 45°$, this relationship allows us immediately determine the angle $\varphi$:

$$\varphi = \frac{1}{2}\tan^{-1}\left[\frac{2H_{xy}}{H_{yy} - H_{xx}}\right]. \quad (5)$$

Consequently, we can calculate the principal components themselves:

$$H_{x'x'} = \frac{H_{xx}\cos^2\varphi - H_{yy}\sin^2\varphi}{\cos^2\varphi - \sin^2\varphi} \quad (6)$$

$$H_{y'y'} = \frac{H_{xx}\sin^2\varphi - H_{yy}\cos^2\varphi}{\sin^2\varphi - \cos^2\varphi}.$$

The principal components are in a plane transverse to the longitudinal axis of the tool. When $\varphi=45°$, the full set of eqns. (4) must be solved.

The two effects discussed above (eccentering and fracturing) are examples in which the response of the 3DEX tool is affected by the orientation of the tool. The correction given by eqns. (1)-(6) is referred to as an azimuthal correction. The azimuthal correction corrects for the effect of a disturbance in the azimuthal direction of the multi-component measurements by causes such as eccentering and fracturing.

Figure 5:
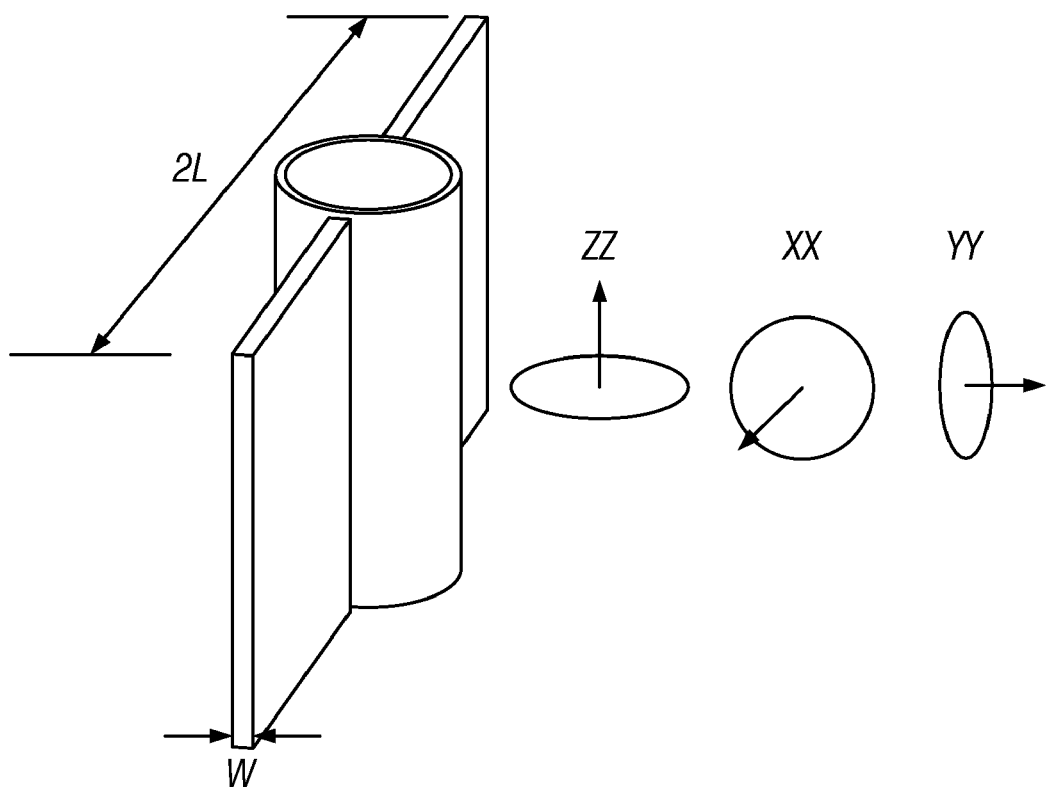
FIG. 5 illustrates a model used for simulating fractures in the subsurface.
Figure 6:
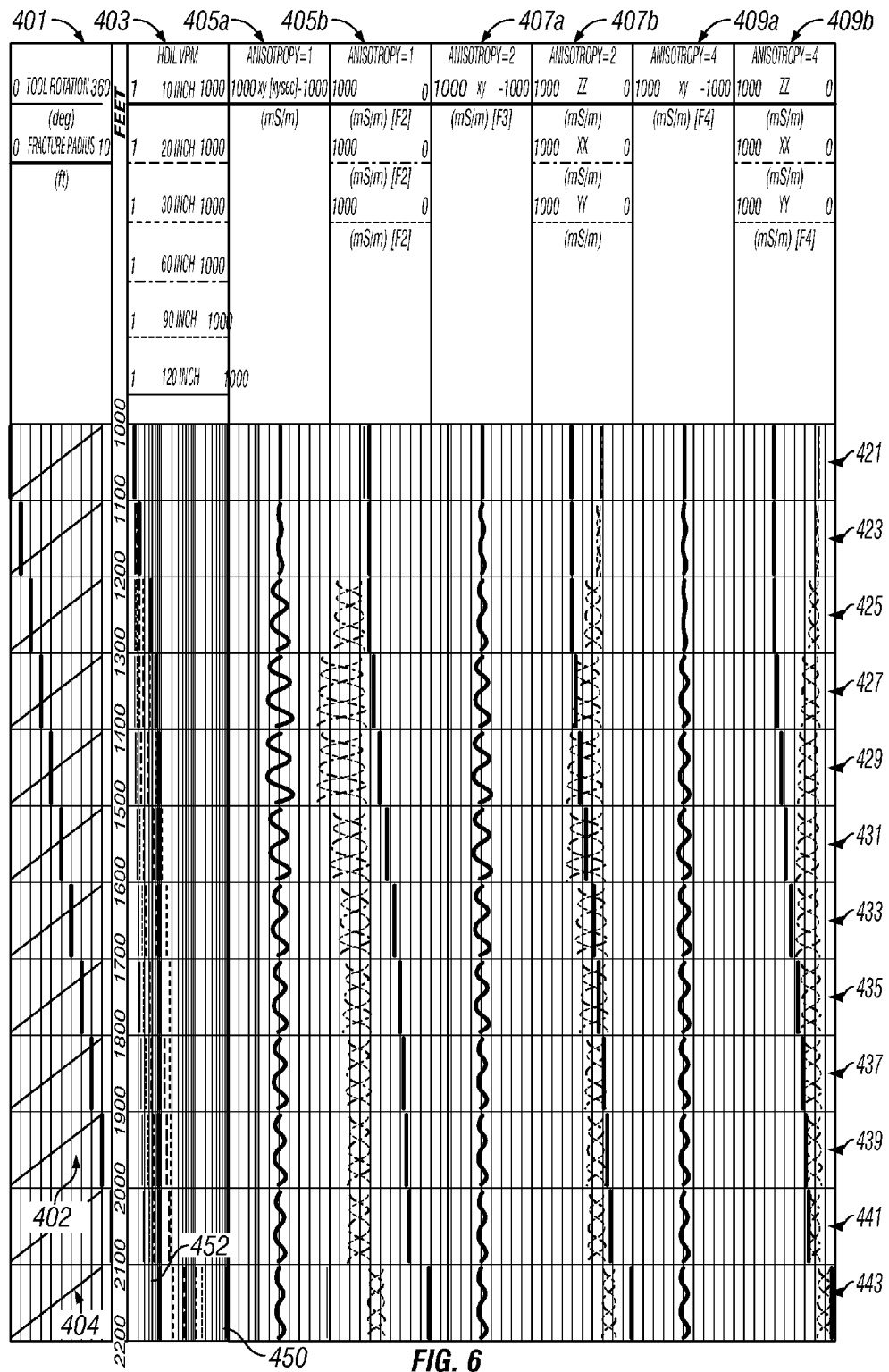
FIG. 6 illustrates simulation results for vertical resistive fractures of different length on HDIL and skin effect corrected (SEC) 3DEX measurements.

We next discuss the effect of a vertical fracture on the $H_{zz}$ component. FIG. 5 shows a model that was used for simulating the effect of a vertical fracture. A fracture of radial extend 2L and width W intersects a vertical wellbore. FIG. 6 depicts the results of numerical simulation for the High Definition Induction Log (HDIL), (focused curves) and 3DEX (skin-effect corrected) curves. The HDIL is an array induction tool with transmitter and receiver coils parallel to the tool axis. Presented are twelve different fracture radii—from 0 (no fracture) to 10 feet and infinite fracture (421, 423, 425, 427, 429, 431, 433, 435, 435, 437, 439, 441 and 443)—for 3 different vertical resistivities: with anisotropy ratios of 1, 2, and 4 (a total of 36 cases). The length of the fracture increases in the Z direction (presented in the track 401 by the discontinuous line 402). For each fracture radius 100 ft of data are generated where the tools rotate from 0 to 360 degrees. The tool rotation is depicted schematically by 404. The HDIL focused curves are in track 403. In the next three pairs of tracks (405a-405b), (407a-407b) and (409a-409b), we depict 3DEX SEC curves for three anisotropy values ($\lambda$=1, 2 and 4 with two tracks for each). The first track in each pair is the XY component while the second track in each pair shows the ZZ, XX and YY components.

Several observations may be made on this figure. It is seen that the HDIL response is similar to that of resistive invasion—shallow focused curves read higher resistivity than the deep ones. This behavior of the focused curves is easy to explain: a shallow resistive fracture is an obstacle for the shallow induced currents that contribute mostly to the short subarrays. Note that in the top interval 421 there is no visible separation between the different curves in track 403 that correspond to the different transmitter-receiver spacing in the HDIL, while at the largest fracture length (interval 443), the shallow curve 450 reads higher resistivities than the deep curve 452. The induced currents with a large radius (that mostly contribute to the deep curves) are not affected at all or affected very little by shallow fractures. It is noted that a 120 in. (3.048 m) depth of investigation curve does not change unless the length of the fracture becomes greater than 4 ft (1.219 m).

Figure 7A:
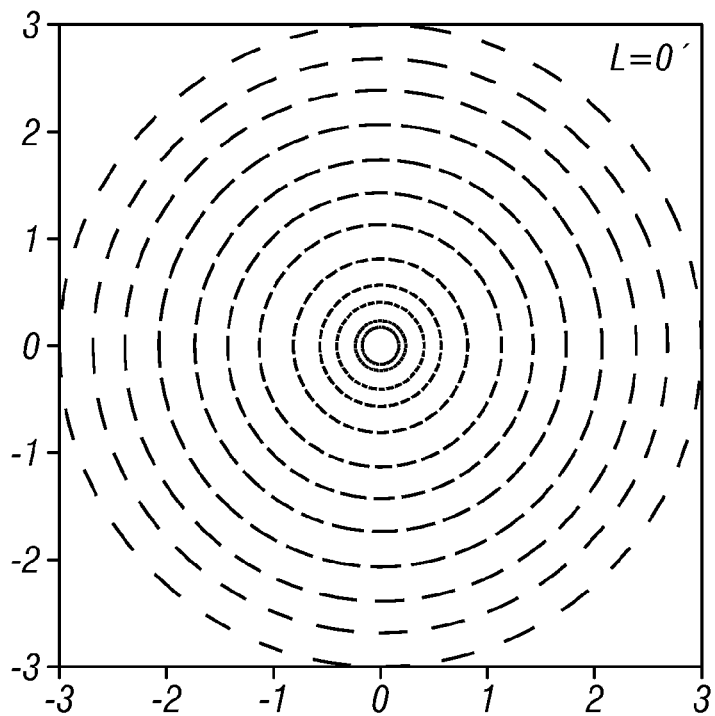
FIGS. 7a-7d show simulated current flows in a horizontal plane intersected by a vertical fracture.
Figure 7B:
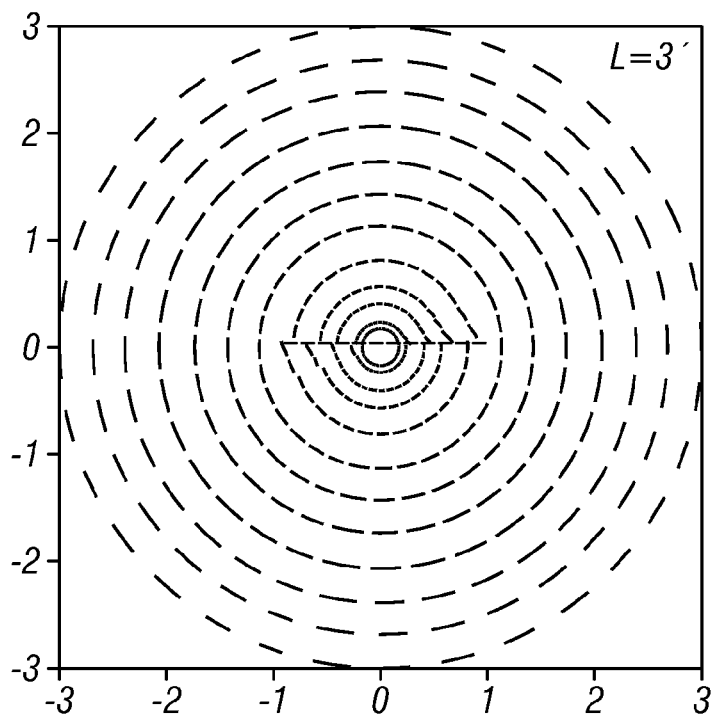
Figure 7C:
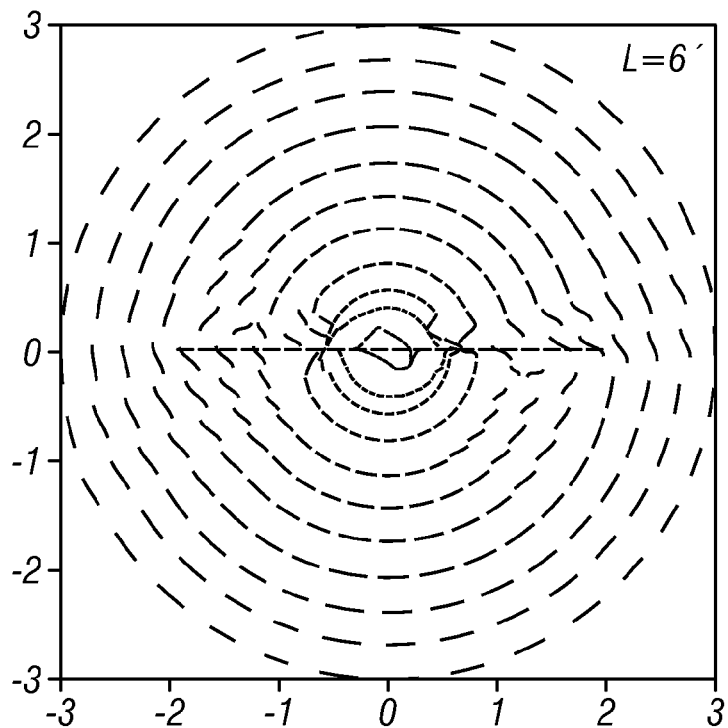
Figure 7D:
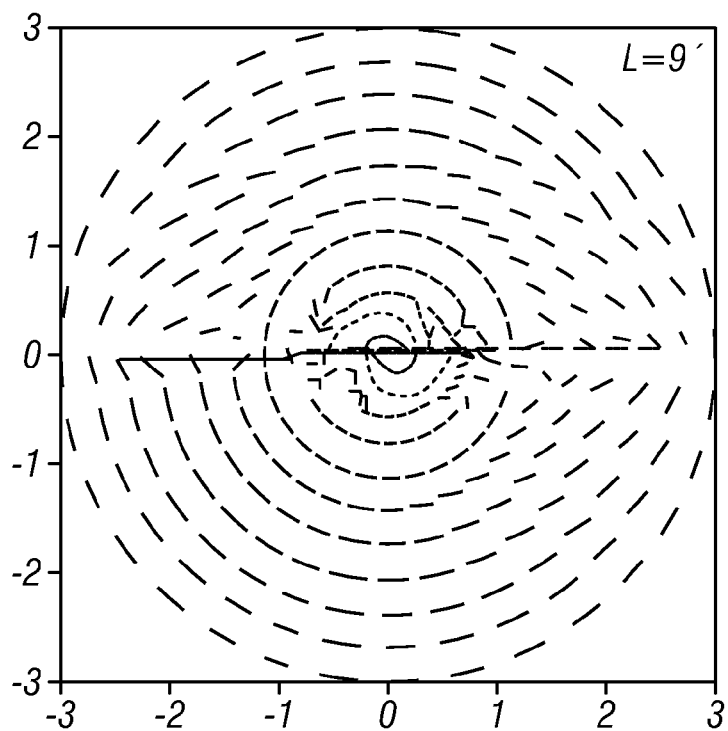

FIGS. 7a-7d show the simulated current flow in a horizontal plane for a coil with its axis parallel to the borehole. FIG. 7a is for L=0 and shows undisturbed current flowing around the borehole. FIG. 7d is for L=9 in (22.86 cm) and shows the significant disruption of current flow around the borehole. FIGS. 7b and 7c (which correspond to fracture radial extents of 3 in (0.076 m) and 6 in (1.52 m) respectively) show results that are intermediate to those in FIGS. 7a and 7d.

The modeling results above show that a multi-array induction tool such as the HDIL has a good sensitivity to the radial extent of a vertical resistivity fracture. A simple inversion algorithm has been developed for estimation of the radial extent of a fracture using the array induction data. At every depth, we have 6 measurements and 2 unknowns—the formation resistivity and the radial extent of the fracture. For simplicity, vertical variations in resistivity are not presently accounted for, though they could be. A look-up table of HDIL responses for different formation resistivities and different radial extent of the fractures enables the use of basic interpolation techniques to recover the formation resistivity and the radial extent of the fracture.

A table lookup can also be done for different formation resistivities for different borehole sizes and different mud conductivities. This enables the determination of the recovery of the formation resistivity using measurements made with an eccentered tool.

The use of $H_{zz}$ measurements in conjunction with various combinations of $H_{xx}$ and $H_{yy}$ measurements is discussed, for example, in U.S. Pat. No. 6,636,045 to Tabarovsky et al., having the same assignee as the present disclosure and the contents of which are incorporated herein by reference. In the present disclosure, once the corrected $H_{zz}$ measurement is obtained, then it is possible to estimate the horizontal and vertical formation resistivities using $H_{x'x'}$ or $H_{y'y'}$, or an average of $H_{x'x'}$ and $H_{y'y'}$ measurements as discussed above.

Figure 8:
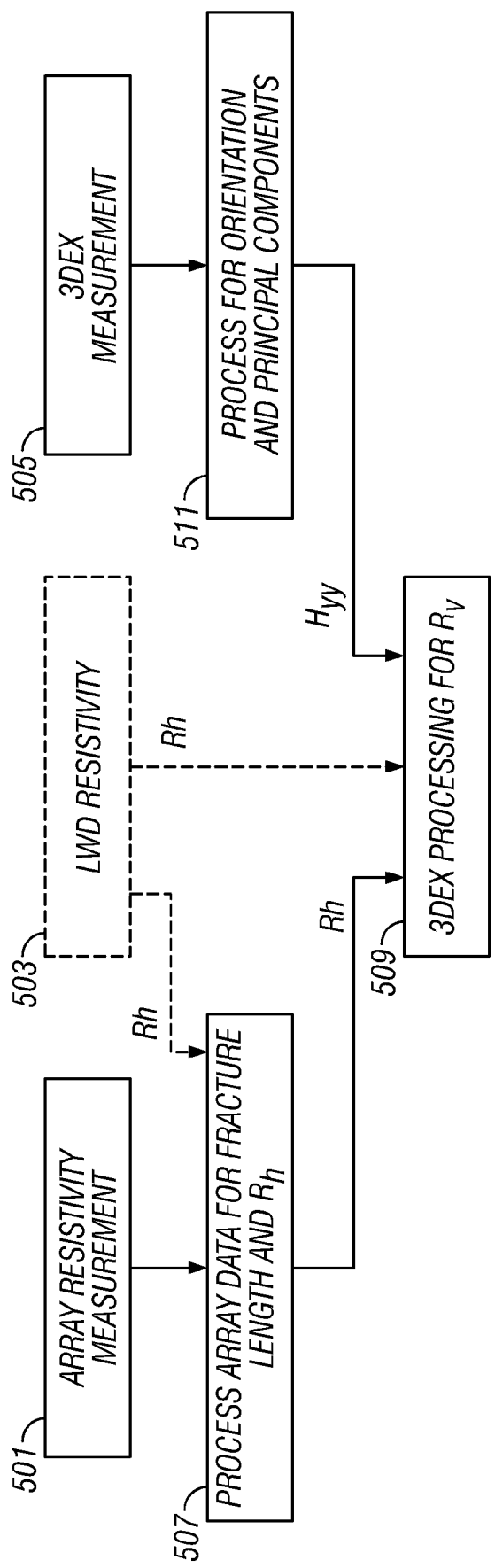
FIG. 8 is a flow chart illustrating different embodiments of the present disclosure.

FIG. 8 illustrates some of the possible embodiments of the disclosure discussed in Rabinovich '548. 3DEX measurements are obtained 505 where the measurements are affected by azimuthal variations. Examples of these azimuthal variations that have been discussed above include the effects of eccentering or the effect of a fracture. These measurements are processed to correct the orientation effects 511 as discussed above. In one embodiment of the disclosure, conventional LWD resistivity measurements are obtained 503. The conventional LWD measurements are used to estimate $R_h$, and as long as there are no pre-existing fractures in the earth formation, can be used in combination with the corrected measurement from 511 to estimate horizontal and vertical formation resistivity 509. As noted above, the corrected measurement may be $H_{x'x'}$ or $H_{y'y'}$, or an average of $H_{x'x'}$ and $H_{y'y'}$, and the estimation may be done using, for example, the method of Tabarovsky.

As an alternative to using LWD resistivity measurements for getting $R_h$, array resistivity measurements may be used 501. The array resistivity measurements may be inverted to determine the fracture length 507 (as discussed above) and get an estimate of $R_h$. Optionally, $R_h$ from LWD measurements may be used as part of the inversion 507. The estimate of $R_h$ from 507 may then be used in conjunction with the corrected measurement from 511 to get the horizontal and vertical resistivity of the formation 509.

Those versed in the art and having the benefit of the present disclosure would recognize that in a vertical borehole, multifrequency-focused data (MFF data) can be rotated. In a deviated borehole, as discussed below, it is preferable to rotate single frequency data and then apply the rotation.

Figure 9:
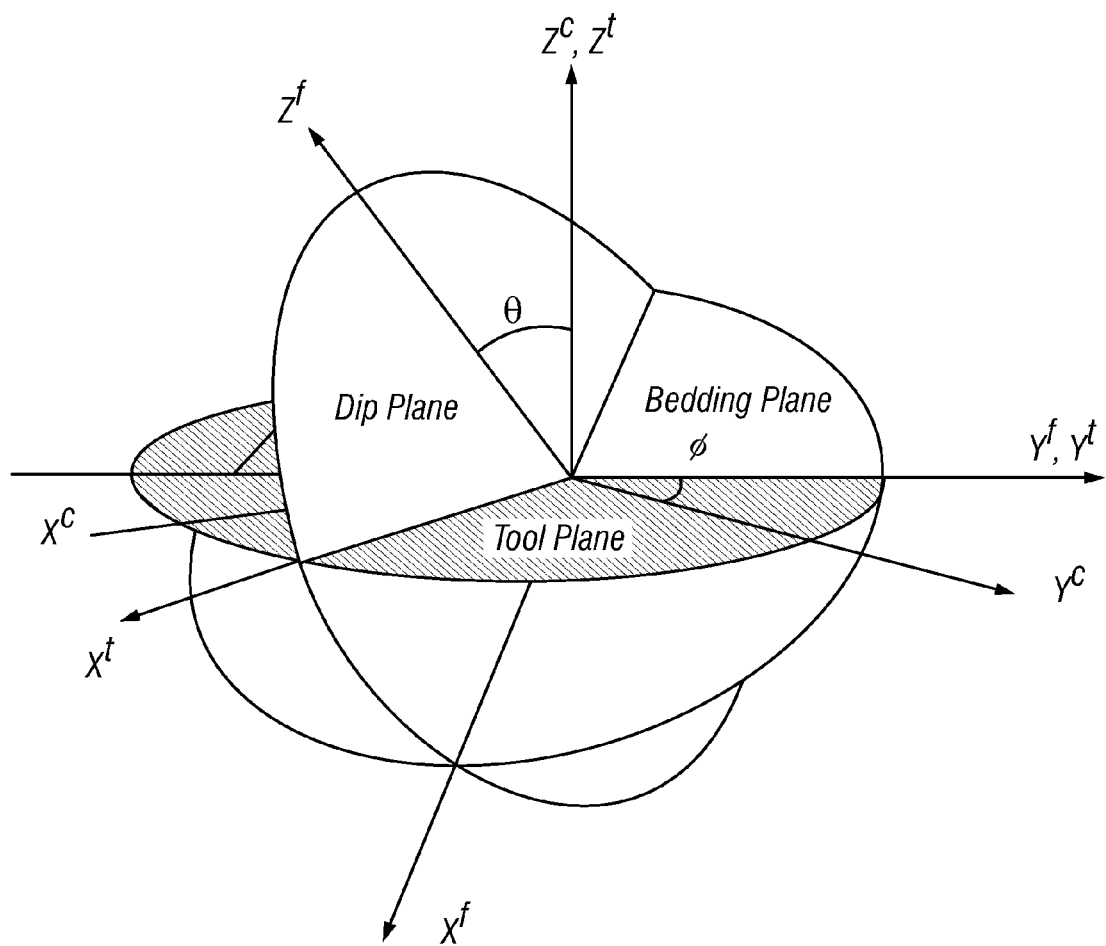
FIG. 9 shows the different angles of interest in a deviated borehole.

FIG. 9 shows the geometry and the angles involved in a deviated borehole. The z-axis of the formation coordinate system, $Z^f$, is normal to the bedding plane, while $X^f$ and $Y^f$ are on the bedding plane. The tool coordinate system is described by $(X^t, Y^t, Z^t)$ in FIG. 9. The z-axis of the tool system is normal to the tool plane and $X^t$ and $Y^t$ are on the tool plane. The two formation angles, $\theta$ and $\phi$, are to be recovered from our inversion processing, as well as the horizontal and vertical resistivities $R_h$ and $R_v$.

The MFF works very well in oil-based and fresh mud systems. In salty muds with Rt/Rm contrast over 50-100 and eccentricity 1-2 inches (2.54-5.08 cm) the eccentricity effect on some of the 3DEX components can reach hundreds and thousands percent. In such extreme conditions application of MFF technique requires very high accuracy of the data (0.01%), which is difficult to achieve in real measurements.

In the wells with no relative dip a simple rotation of multifrequency focused xx, yy, and xy components allows us to extract unaffected x'x' component which can be used in the subsequent processing for electrical anisotropy as discussed above. However in the presence of relative dip, this technique may not be reliable, because formation dip and azimuth also affect the measurements.

We conducted a 3-D numerical simulation study to evaluate the eccentricity effects on the 3DEX data in deviated wells. We discovered that if the tool was eccentered exactly in the direction of XX component, the only component that cannot be properly corrected by MFF technique is YY. The other components after MFF show no or very little dependence on eccentricity (See Tables 2 and 3).

TABLE 2

Eccentricity effects in Model 1. Rm = 0.05 Ω-m, BHD = 12.25 in, Rh = 2.5 Ω-m, Rv = 5 Ω-m, Relative Dip = 45°. Relative Rotation = 30°. Tool is eccentered in the direction of XX component.

| Eccentricity (in) | Apparent conductivities for 9 components (mS/m) | | | | | | | | |
|---|---|---|---|---|---|---|---|---|---|
| | XX | YY | ZZ | XY | XZ | YX | YZ | ZX | ZY |
| 0.0 | 338 | 310 | 344 | −76 | 119 | −74 | −82 | 121 | −84 |
| 0.5 | 339 | 303 | 348 | −77 | 119 | −74 | −81 | 121 | −84 |
| 1.0 | 339 | 284 | 344 | −78 | 119 | −74 | −82 | 121 | −84 |
| 1.5 | 338 | 248 | 347 | −79 | 119 | −73 | −82 | 121 | −85 |
| 2.0 | 338 | 201 | 347 | −80 | 119 | −74 | −81 | 120 | −84 |
| No borehole | 341 | 313 | 348 | −76 | 124 | −76 | −82 | 124 | −82 |

TABLE 3

Eccentricity effects in Model 2. Rm = 0.05 Ω-m, BHD = 12.25 in, Rh = 25 Ω-m, Rv = 50 Ω-m, Relative Dip = 45°. Relative Rotation = 45°. Tool is eccentered in the direction of XX component.

| Eccentricity (in) | Apparent conductivities for 9 components (mS/m) | | | | | | | | |
|---|---|---|---|---|---|---|---|---|---|
| | XX | YY | ZZ | XY | XZ | YX | YZ | ZX | ZY |
| 0.0 | 33 | 33 | 34 | −8 | 10 | −8 | −10 | 10 | −11 |
| 0.5 | 33 | 14 | 34 | −9 | 10 | −9 | −10 | 10 | −11 |
| 1.0 | 33 | −50 | 34 | −9 | 10 | −8 | −10 | 9 | −11 |
| 1.5 | 32 | −95 | 35 | −9 | 11 | −8 | −10 | 8 | −11 |
| 2.0 | 32 | −147 | 36 | −10 | 10 | −9 | −10 | 9 | −11 |
| No borehole | 33 | 33 | 35 | −8.4 | 10.5 | −8.4 | −10.5 | 10.5 | −10.5 |

Figure 10C:
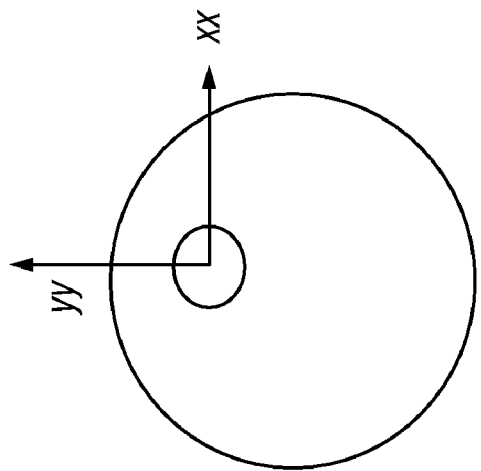
FIG. 10a-10c show a centered tool and two possible directions of eccentering of the tool in the borehole.
Figure 10B:
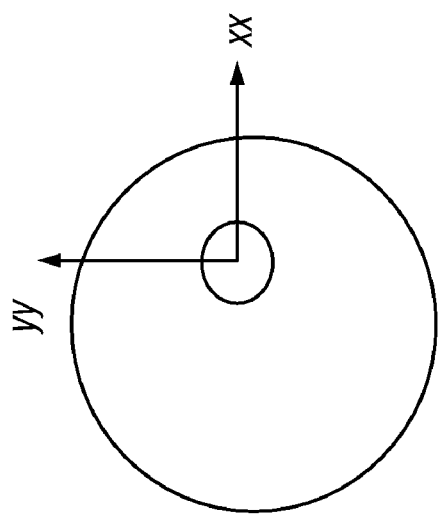
Figure 10A:
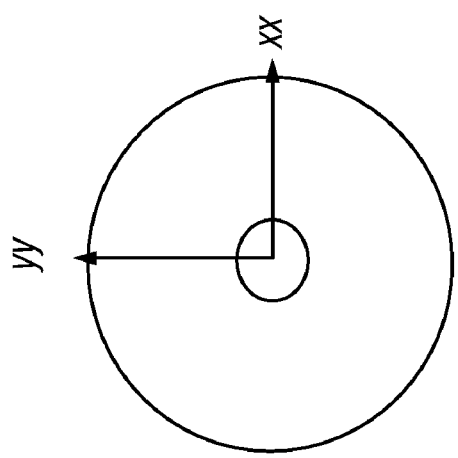

The reason for the ability to recover the xx components can be seen with reference to FIGS. 10a-10c Shown in FIG. 10a is a centered tool in a circular borehole. In FIG. 10b, the tool is displaced in the x-direction but with the x-coil oriented along a diameter of the borehole. When this happens, it can be seen that the eddy currents in the fluid due to a transmitter oriented in the x-direction will be symmetric with respect to the x-axis. On the other hand, the eddy currents in the fluid due to a y-transmitter which is not oriented along a borehole diameter will be asymmetric with respect to the y-axis. The situation is reversed in FIG. 10c, i.e., when the tool is displaced along the y-axis, the eddy currents are symmetric about the y-axis and the eddy currents are not symmetric about the x-axis. The imbalance affects some components and not others.

Referring back to Tables 2 and 3, it means that all components except the yy component can be still used for conventional 3DEX processing for formation dip and azimuth, Rh and Rv. When the tool is eccentered in an arbitrary direction with respect to the tool's x-axes (which is most likely the case for the real logging environment), we expect four components xx, yy, xy, and yx to be affected by tool eccentricity. That leaves us with only 3 independent MFF components zz, xz, and yz (zx=xz, zy=yz) which are not sufficient to resolve four unknowns $R_h$, $R_v$, θ and φ.

The present disclosure may use one of two different approaches to address this problem. The first approach is based on the fact that the eccentricity effect on single frequency measurements in conductive deviated boreholes is significantly stronger than the effect of formation dip and azimuth. Our numerical experiments show that we can neglect the effect of the formation dip in single frequency measurements and use the same equations to determine the eccentricity direction we use in case of vertical wells discussed above.

Figure 11:
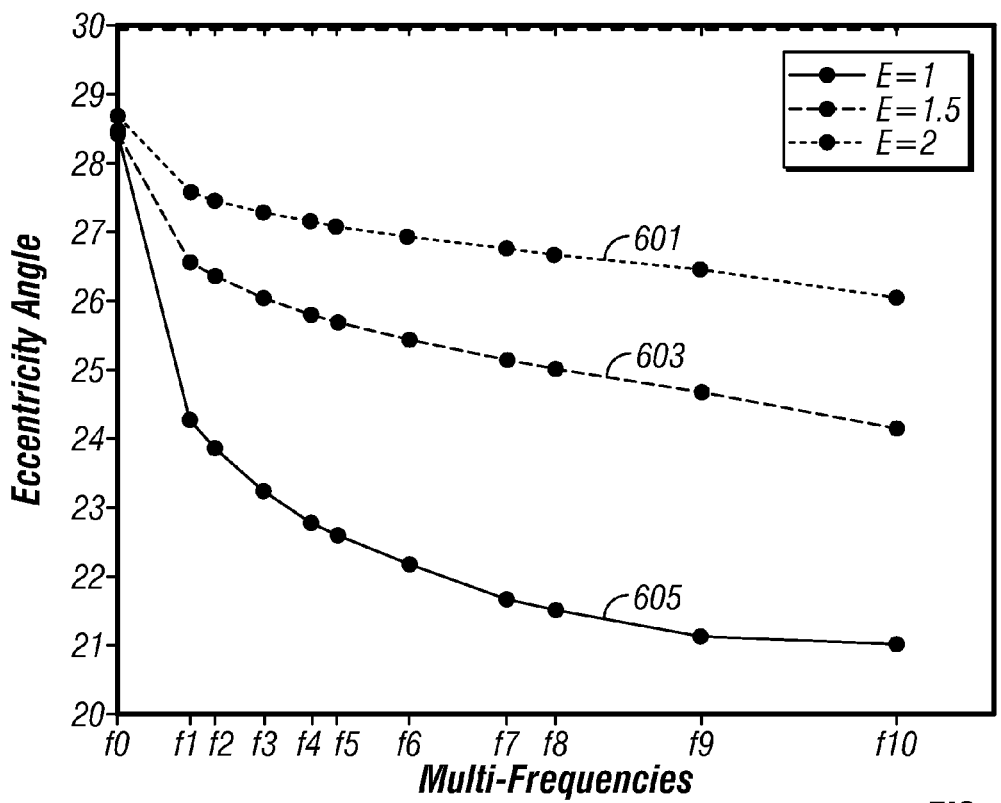
FIG. 11 illustrates the determined rotation angle from single-frequency measurements for different eccentricities for a model with an eccentricity angle of 30°.

FIG. 11 shows the results of determining the rotation angle from single frequency measurements for a model in which the eccentricity angle is 30°. The abscissa is the frequency used for determination of the rotation angle. The curve 601 is for an eccentricity of 1 inch (2.54 cm), the curve 603 is for an eccentricity of 1.5 inches (3.81 cm) while 605 is for an eccentricity of 2 inches (5.08 cm). The point at $f_0$ corresponds to the skin-effect corrected data. As can be seen, the skin-effect corrected measurement gives an accurate estimation of the eccentricity angle.

Figure 12:
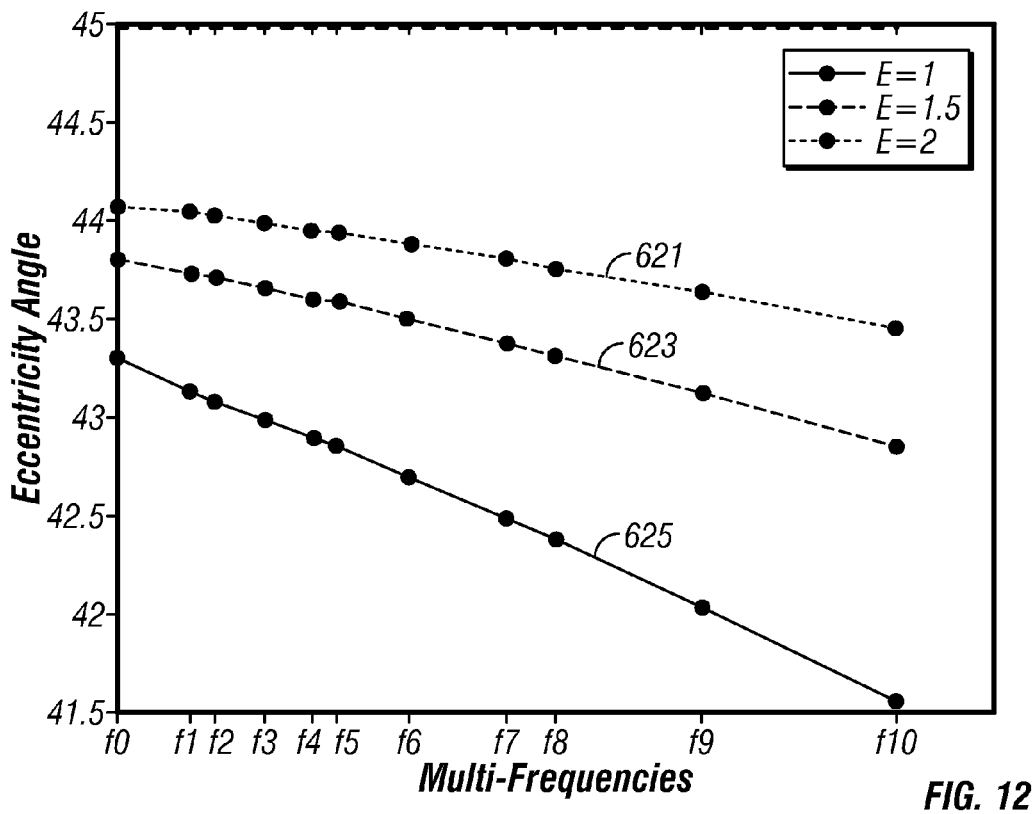
FIG. 12 illustrates the determined rotation angle from single frequency measurements for different eccentricities for a model with an eccentricity angle of 45°.

FIG. 12 shows corresponding results for the case where the eccentricity angle is 45°. The curves 621, 623 and 625 are the estimated eccentricity angles from single frequency measurements for eccentricities 0.1 in, 1.5 inches and 2 inches (2.54 cm, 3.81 cm and 5.07 cm) respectively. Again, skin-effect corrected measurement gives the best estimate of the eccentricity angle.

Figure 13:
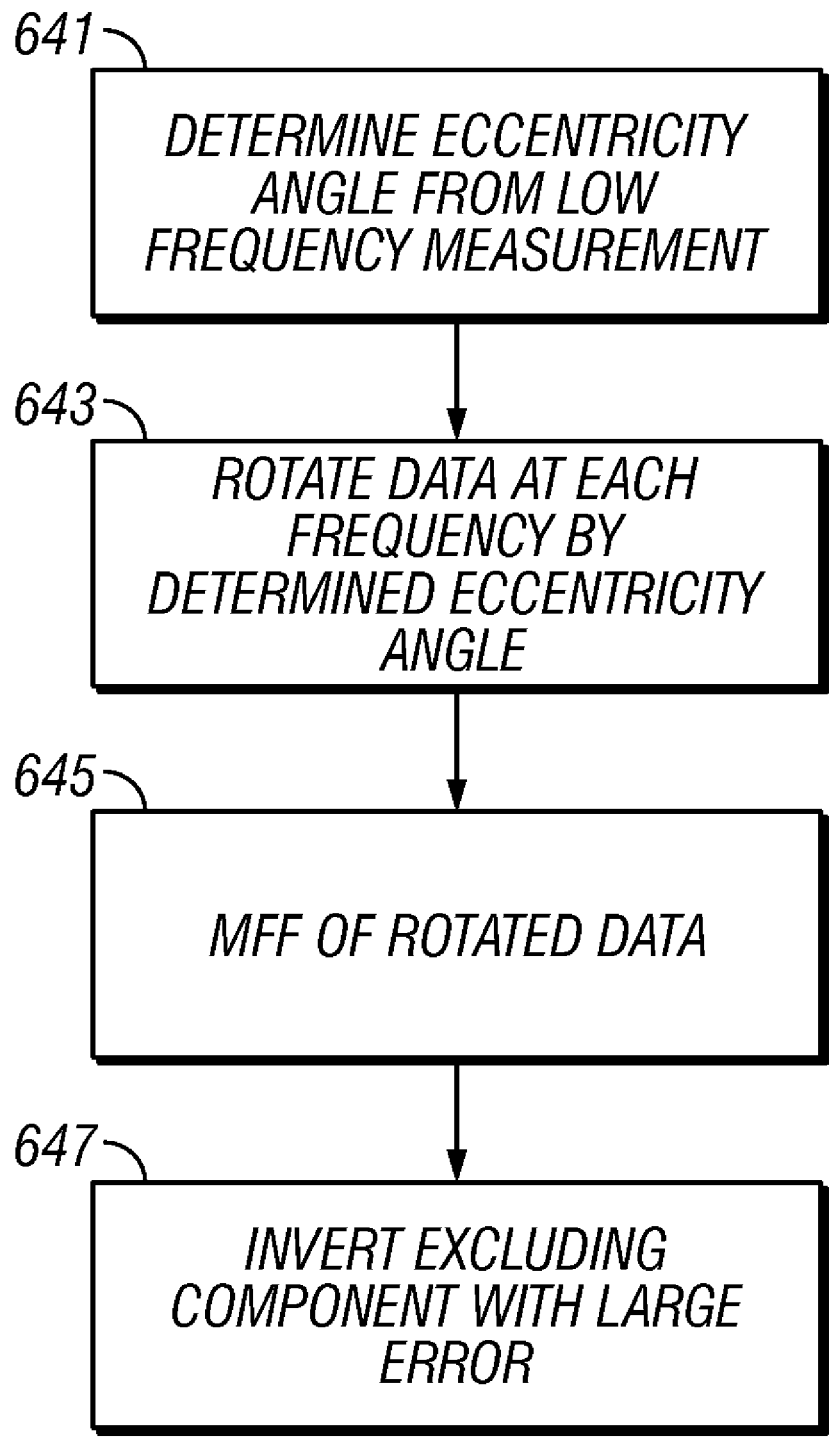
FIG. 13 illustrates a flow chart of an embodiment of the disclosure used in deviated boreholes.

Turning now to FIG. 13, an embodiment of the present disclosure for the determination of formation horizontal and vertical resistivities using multi-frequency 3DEX measurements in a deviated borehole is illustrated. At each depth, the eccentricity direction is determined 641 using the skin-effect corrected 3DEX measurements. This estimated eccentricity angle is then used to rotate 643 the 3DEX data at all the frequencies. With this rotation, as discussed above, the y'y' data will be unreliable. A multifrequency focusing of the rotated data is performed 645. MFF of the y'y' data may be omitted due to its unreliability. The focused and rotated data are then inverted 647 to give the formation resistivities, relative dip angle and azimuth angle without use of the y'y' data. The data may be interpreted according to the principles enunciated in U.S. Pat. No. 6,470,274 to Mollison et al., U.S. Pat. No. 6,643,589 to Zhang et al., U.S. Pat. No. 6,636,045 to Tabarovsky et al., and U.S. Pat. No. 6,686,736 to Schoen et al., the contents of which are incorporated herein by reference. This includes the determination of $R_h$ and $R_v$, the relative dip angle, the azimuth angle, the sand and shale fractions, the water saturation, and the permeability of the formation.

Figure 14A:
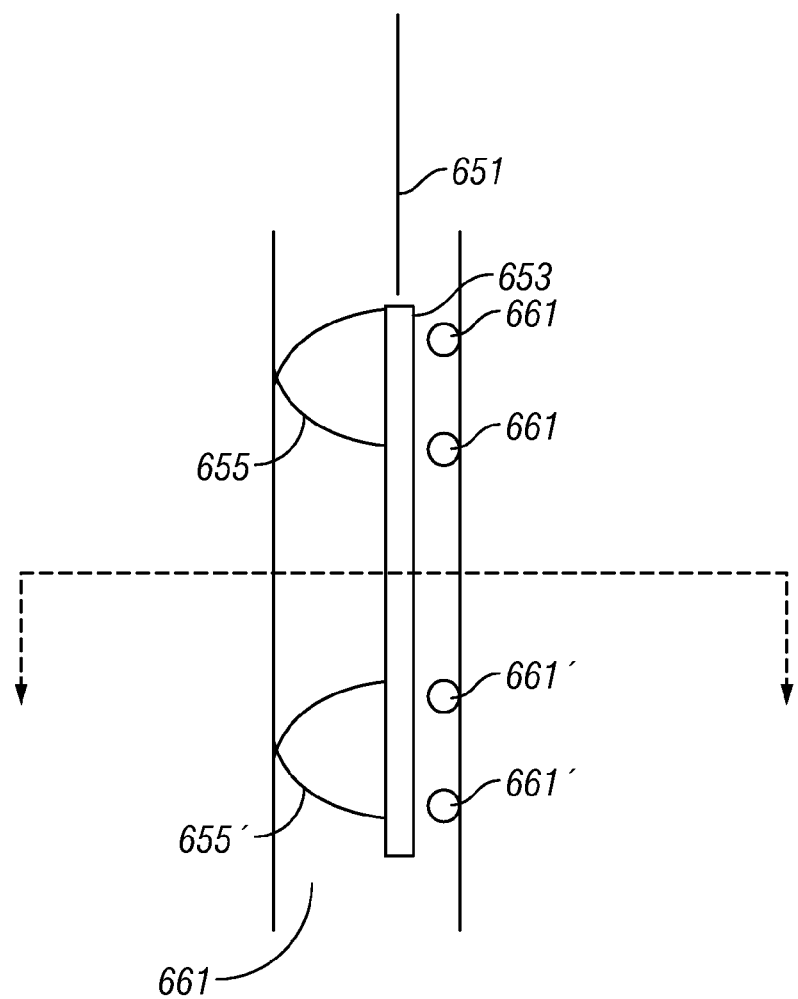
FIGS. 14a, 14b shows an embodiment of the disclosure in which bowsprings are used to maintain a transverse coil oriented along a borehole diameter.
Figure 14B:
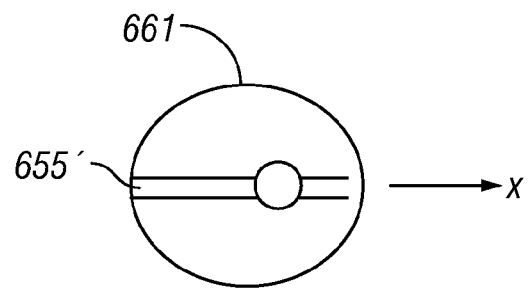

Another embodiment of the disclosure makes use of the current symmetry for an eccentered tool as shown in FIGS. 10a-10c. The mechanical arrangement is illustrated in FIGS. 14a, 14b. A wireline 651 conveys a logging tool 653 into the borehole 661. Bowspring devices 655, 655' are oriented parallel to the axis of the x coil of the longitudinal tool. This positions the tool within the borehole in the configuration shown in FIG. 14b wherein the tool is eccentered in the direction of the x axis. Standoffs 661, 661' are provided to avoid strong borehole effects on the z coil. Using the tool shown in FIGS. 14a, 14b, it is possible to bypass the steps 641 and 643 in FIG. 13 and proceed directly to the multi-frequency focusing and inversion.

The hardware configuration shown in FIG. 14 is one of many arrangements that may be used to ensure that the currents circulating in the mud near the receiver coils cancel each other out. This may be accomplished by having the tool perfectly centralized. Achieving accurate centralization is particularly difficult in horizontal or highly deviated wells. The configuration shown in FIG. 14 has one of the transverse coils oriented along a borehole diameter. In the embodiment of the disclosure shown in FIG. 15, this is carried further and both x- and y-coils are oriented along a borehole diameter.

Figure 15:
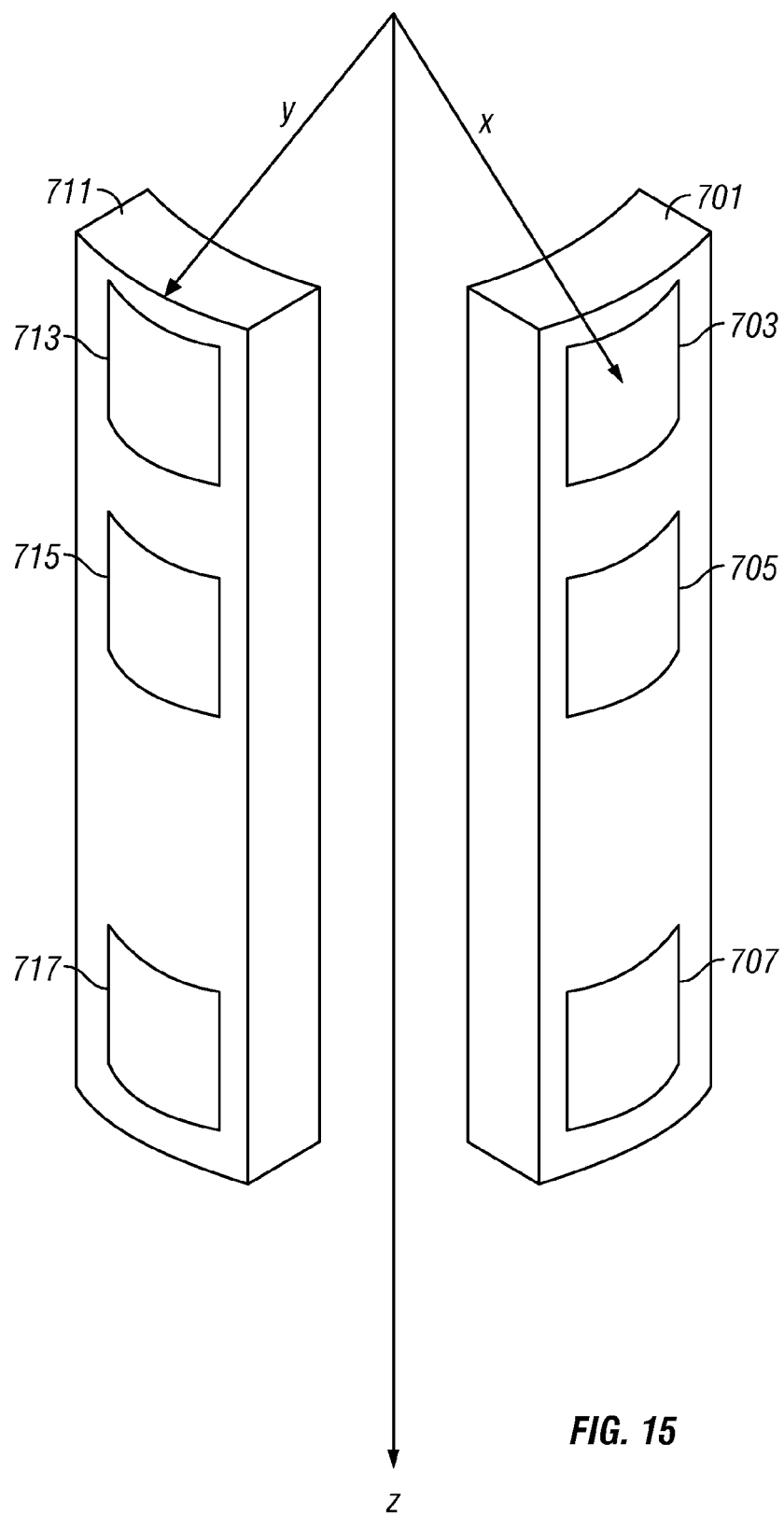
FIG. 15 shows an arrangement in which transmitter and receiver coils are mounted on two mandrels maintained at substantially 90° to each other.

Shown in FIG. 15 are two mandrels 701, 711. Mandrel 701 is provided with an x transmitter coil 707, and x receiver coil 703 and an x bucking coil 705. Similarly, mandrel 711 is provided with a y transmitter coil 717, a y receiver coil 713 and a y bucking coil 715. The use of bucking coils would be known to those versed in the art and is not discussed further here.

Each of the mandrels 701, 711 may be provided with its own set of bowsprings and standoffs. This is not shown in FIG. 15 but has been discussed above with reference to FIGS. 14a, 14b. An appropriate mechanical arrangement (not shown) is provided to maintain the two mandrels oriented at 90° to each other. With such an arrangement, each of the coils can be maintained close to the borehole wall and also be oriented along a borehole diameter.

Figure 16:
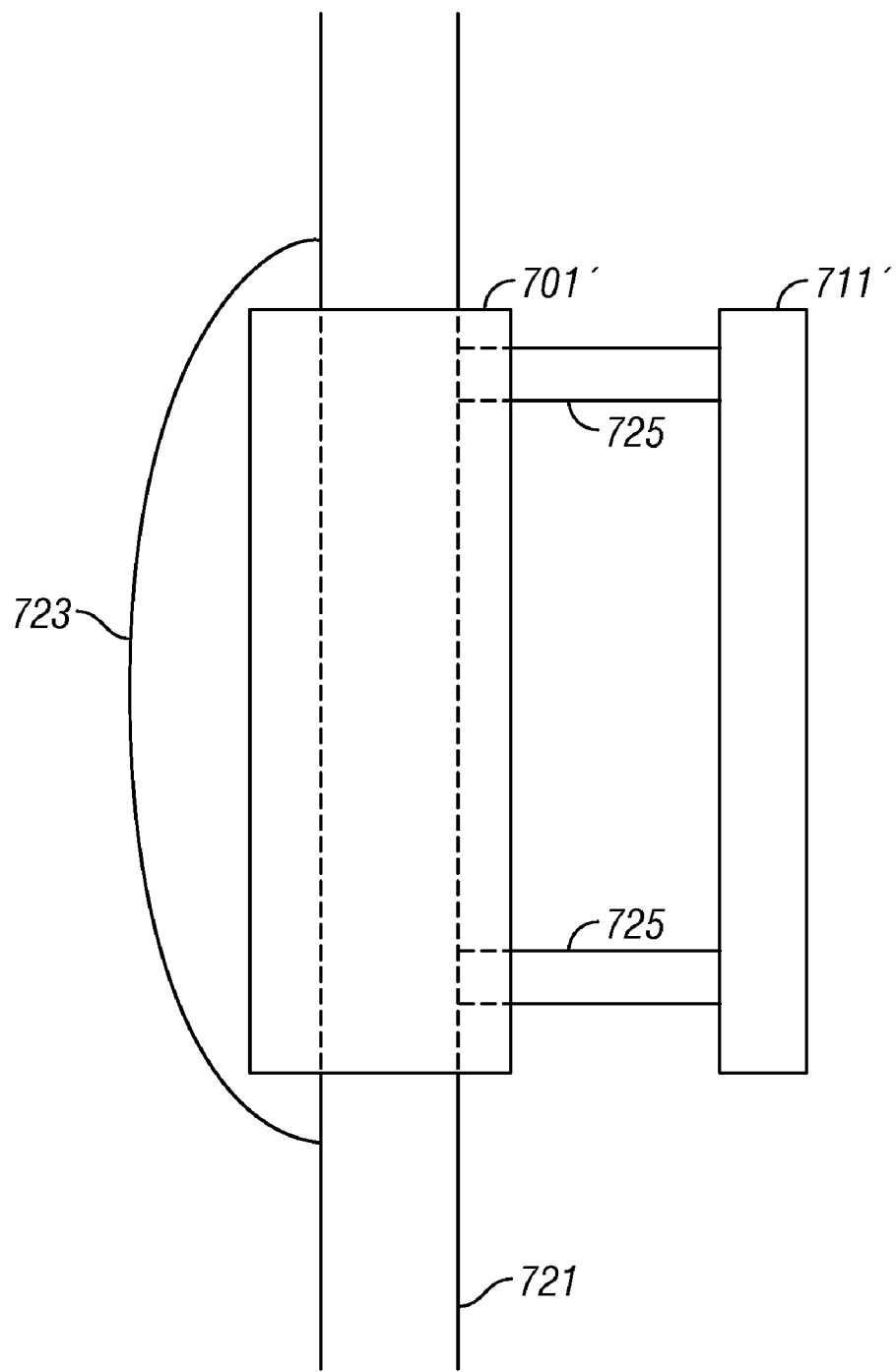
FIG. 16 shows an arrangement in which two mandrels are extended from a central housing in one embodiment of the present disclosure.

The desired configuration of the mandrels illustrated in FIG. 15 can be obtained by modifying a conventional pad-mounted imaging tool such as that disclosed in U.S. Pat. No. 6,714,014 to Evans et al., having the same assignee as the present disclosure and the contents of which are incorporated herein by reference. This is schematically shown in FIG. 16. The two mandrels 701', 711' are extendable from a central housing 721 by extension arms 725. The extension arms provide electrical communication between the antenna coils on the mandrels and the electronics in the housing. The mandrels are maintained at the required 90° orientation. Extension devices 723 (of which one is shown), possibly bowsprings, are provided opposite the two extendable mandrels to maintain the central housing in the necessary position in the borehole.

Figure 17:
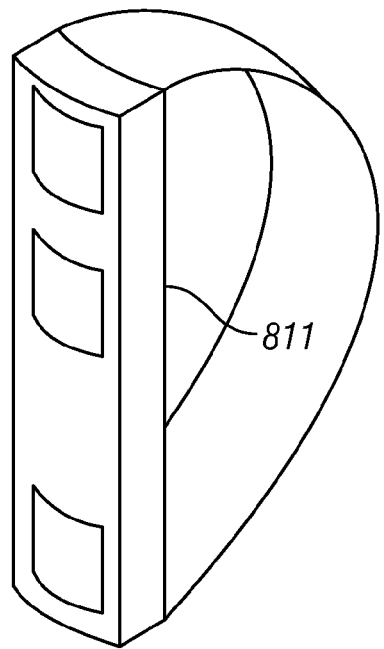
FIG. 17 shows an arrangement in which two mandrels at 90° to each other are spaced apart vertically.
Figure 17:
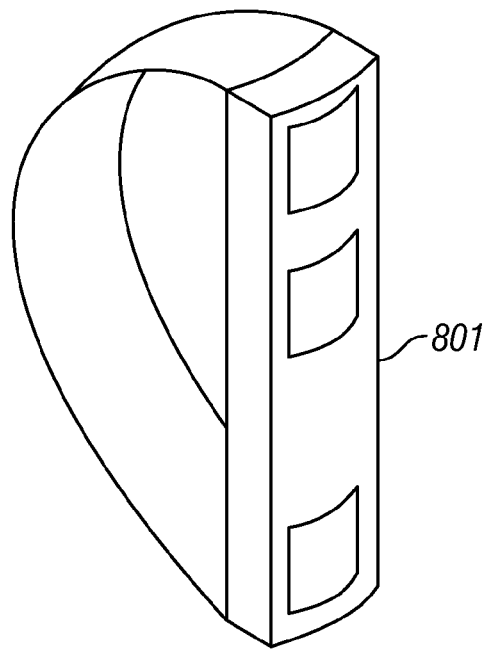

In another embodiment of the disclosure, the two mandrels are not at the same horizontal position. This is illustrated in FIG. 17 where each of the mandrels 801, 811 is provided with its own coils and bowsprings. This arrangement has the disadvantage of not having the coils at the same depth.

Some or all of the processing may be done by a downhole processor, a processor at the surface, or a processor at a remote location. Implicit in the control and processing of the data is the use of a computer program on a suitable machine readable medium that enables the processor to perform the control and processing. The machine readable medium may include ROMs, EPROMs, EEPROMs, Flash Memories and Optical disks. The disclosure may also be implemented in conjunction with a measurement-while-drilling arrangement in which the multi-component and multi-array measurements are made using a suitable device on a bottomhole assembly conveyed on a drilling tubular such as a drillstring.

While the foregoing disclosure is directed to the preferred embodiments of the disclosure, various modifications will be apparent to those skilled in the art. It is intended that all variations within the scope of the appended claims be embraced by the foregoing disclosure.

What is claimed is:

1. A method of determining a resistivity property of an earth formation, the method comprising:
using a conveyance device for positioning a logging tool in a borehole with a center of the tool displaced from a center of the borehole in a first direction;
using the logging tool for making, at a plurality of frequencies, multi-component measurements indicative of a resistivity property of the earth formation; and
using a processor for estimating from the multi-component measurements at the plurality of frequencies the resistivity property of the earth formation; wherein the processor estimates the resistivity property by further:
(i) estimating a value of the first direction from multi-component measurements made at a low frequency; and
(ii) rotating a plurality of the multi-component measurements using the estimated value of the first direction and providing rotated measurements that are not affected by the displacement of the tool from the center of the borehole.

2. The method of claim 1 wherein obtaining the multi-component measurements further comprises using a transmitter antenna on the logging tool with an axis substantially along the first direction.

3. The method of claim 2 further comprising obtaining the multi-component measurements by using an additional transmitter antenna on the logging tool with an axis substantially orthogonal to the first direction.

4. The method of claim 2 further comprising extending the transmitter antenna away from a body of the logging tool.

5. The method of claim 1 wherein estimating the resistivity property further comprises performing an inversion in which at least one of the multi-component measurements is excluded.

6. The method of claim 1 wherein estimating the resistivity property further comprises applying a multifrequency focusing.

7. The method of claim 1 further comprising using the estimated resistivity property to determine at least one of: (i) a horizontal resistivity, (ii) a vertical resistivity, (iii) a relative dip angle, (iv) an azimuthal angle, (v) a sand fraction, (vi) a water saturation, and (vii) a permeability.

8. The method of claim 1 further comprising conveying the logging tool into the borehole on a wireline.

9. An apparatus configured to determine a resistivity property of an earth formation, the apparatus comprising:
a logging tool configured to be positioned in a borehole with the tool displaced from a center of the borehole in a first direction, the logging tool further configured to obtain, at a plurality of frequencies, multi-component measurements indicative of the resistivity property of the earth formation; and
a processor configured to:
(A) estimate from the multi-component measurements at the plurality of frequencies the resistivity property of the earth formation; and
(B) record the estimated resistivity property on a suitable medium;
wherein the processor is further configured to estimate the resistivity property by:
(C) estimating a value of the first direction from multi-component measurements made at a low frequency; and
(D) rotating a plurality of the multi-component measurements using the estimated value of the first direction to give rotated measurements that are not affected by the displacement of the logging tool from the center of the borehole.

10. The apparatus of claim 9 wherein the logging tool is configured to obtain the multi-component measurements by using a transmitter antenna on the logging tool with an axis substantially along the first direction.

11. The apparatus of claim 10 wherein the logging tool is configured to obtain the multi-component measurements by using an additional transmitter antenna on the logging tool with an axis substantially orthogonal to the first direction.

12. The apparatus of claim 10 wherein the transmitter antenna is extendable from a body of the logging tool.

13. The apparatus of claim 9 wherein the processor is further configured to estimate the resistivity property by performing an inversion in which at least one of the multi-component measurements is excluded.

14. The apparatus of claim 9 wherein the processor is further configured to estimate the resistivity property by applying a multifrequency focusing.

15. The apparatus of claim 9 further wherein the processor is further configured to use the estimated resistivity property to determine at least one of: (i) a horizontal resistivity, (ii) a vertical resistivity, (iii) a relative dip angle, (iv) an azimuthal angle, (v) a sand fraction, (vi) a water saturation, and (vii) a permeability.

16. The apparatus of claim 9 further comprising a wireline configured to convey the logging tool into the borehole.

17. A non-transitory computer readable medium product having stored thereon instructions that when read by a processor, cause the processor to:
estimate from multi-component measurements at a plurality of frequencies made by a logging tool displaced from a center of a borehole in an earth formation a resistivity property of the earth formation by first estimating a direction of the displacement using low-frequency measurements;
rotate the multi-component measurements using the estimated direction of displacement to give rotated measurements that are not affected by the displacement;
estimate the resistivity property using the rotated measurements; and
record the estimated resistivity property on a suitable medium.

18. The medium of claim 17 further comprising at least one of: (i) a ROM, (ii) an EPROM, (iii) an EEPROM, (iv) a flash memory, and (v) an optical disk.

* * * * *